UNITED STATES PATENT OFFICE.

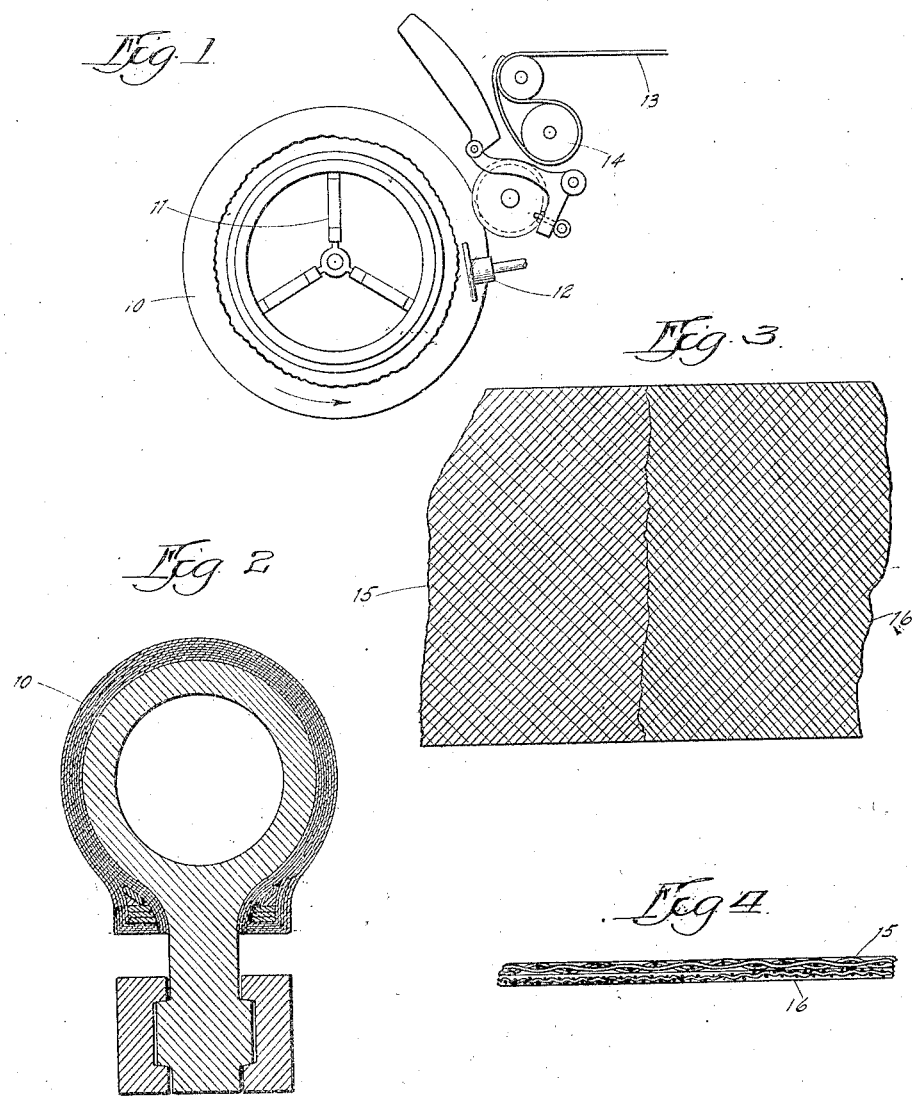

JOHN C. TUTTLE, OF AKRON, OHIO, ASSIGNOR TO THE FIRESTONE TIRE & RUBBER COMPANY, OF AKRON, OHIO, A CORPORATION OF OHIO.

METHOD OF MANUFACTURING TIRES.

1,326,312.   Specification of Letters Patent.   Patented Dec. 30, 1919.

Application filed May 1, 1918. Serial No. 231,813.

*To all whom it may concern:*

Be it known that I, JOHN C. TUTTLE, a citizen of the United States, residing at Akron, county of Summit, State of Ohio, have invented certain new and useful Improvements in Methods of Manufacturing Tires, of which the following is a specification.

This invention relates to the method for manufacturing tire casings, particularly that type of tire known as a cord tire in which the plies or layers of fabric are composed of parallel cords in the direction of the warp held together by small weft threads spaced at intervals. Tires made from this kind of fabric possess certain advantages over ordinary woven fabric tires, as is well understood in the art. The fabric is known in the art as "cord fabric" and by such term is well recognized.

It is the purpose of this invention to improve the methods of manufacture of cord tires composed of cord fabric and to obviate certain disadvantages as will be understood as the description proceeds.

In the drawings accompanying this application there are shown certain of the steps in the improved method of manufacturing.

Figure 1 is a diagrammatic view of a tire in the course of manufacture on a tire machine of the type in which the fabric is spun down on the sides of the core.

Fig. 2 is a cross-section of a core showing a tire carcass thereon.

Fig. 3 is a plan view showing the method of preparing the fabric for the machine.

Fig. 4 is a cross-section of the fabric of Fig. 3.

Prior to being fabricated to a tire carcass, the cord fabric is given a coating of rubber in any suitable manner and is then cut into strips at an angle of 45°.

It has been discovered in the manufacture of tires of this type of fabric that when the fabric is formed on a machine which shapes the fabric to the core by means of radially moving spinning rollers, where the cords in their diagonal positions are presented to the stitchers at an angle by the rotation of the core, they will be straightened out or disarranged from the diagonal positions which they should occupy. Upon the rotation of the core the cords on one side are presented at a different angle to the stitchers than those in the other side of the core, which results in injurious straightening out or disarrangement of the cords on opposite sides of the tire as the plies are alternated in direction.

In order to obviate this difficulty I have devised a method of manufacture by which the plies of cord fabric mutually reinforce one another and objectionable distortion of the cords is prevented.

In Fig. 1 there is shown a core at 10, the edge of the unapplied fabric being indicated by the wavy line. The core is carried by the chuck 11 and is designed to rotate in the direction shown by the arrow, the fabric being applied to the core by a pair of radially advancing stitching rollers, one only being shown at 12. The fabric is shown at 13 and the stretching mechanism is shown at 14. The machine may be of any well known type and it is not necessary to show the apparatus further than has been indicated.

The invention consists in applying the fabric to the tire in double layers at an angle to one another whereby those cords which are at an angle to the stitcher as it advances over the side of the core are reinforced by other cords in line with the stitcher so that the first named cords are not distorted or displaced from the position they are intended to occupy. It is preferable to have the warp threads at an angle of 90° to one another in the adjacent plies as this arrangement tends to strengthen the layers and prevent distortion more effectively and at the same time as the fabric is laid on the core at an angle of 45° this places the cords in the best possible position.

In manufacture of the cord tires by my improved method the plies are placed one on top of the other, the pairs of plies being pressed together and held by the sticky rubber coating applied on them, and put on two by two as far as possible, although it may be necessary to put on a single ply at odd times, depending upon the number of plies in the finished tire. In Fig. 2 I have shown a carcass in which there are eight plies, four over and four under the bead, which have been put on in pairs with the warp threads at an angle of 90° to each other. The double layer is shown in Figs. 3 and 4 in which one layer is 15 and the other is 16, the heavier warp threads being indicated by the lines close together and the light weft threads being indicated by the lines farther apart.

By the method of manufacture indicated herein it is possible to build cord tires of this type on the ordinary tire making machines which employ spinning rolls or disks and the cords will not be displaced by the action of the rolls. It is not intended to limit the method of manufacture to this type of machine as the method will be advantageous with any kind of tire building machine.

It is not essential that the number of plies shaped to the core at the same time be limited to two plies, as three or more may be incorporated into the tire body at the same time, the essential feature being that one or more of the plies be placed in opposite direction to the others for the purposes set forth.

It is also possible to practise my invention by applying one layer of fabric to the core, then applying another layer to the core with the threads at an angle and then spinning down the two layers simultaneously.

Other changes and modifications may be made in the method of manufacture over that described here without departing from the spirit of the invention or sacrificing any of its benefits.

I claim:

1. The process of manufacturing tires from "cord fabric" comprising the steps of laying up a plurality of plies of fabric with the warp threads crossing, applying the fabric about a core, and shaping the edge of the fabric to the core by a spinning operation.

2. The process of manufacturing tires from fabric comprised of a layer of parallel cords comprising the steps of uniting two layers of fabric with their warp threads crossing, applying said fabric over the core, and shaping the edges of the fabric to the core by spinning rolls advancing radially of the core.

JOHN C. TUTTLE.